United States Patent
Schirrmeister

(10) Patent No.: US 12,459,107 B2
(45) Date of Patent: Nov. 4, 2025

(54) DEVICE FOR SUPPORTING AT LEAST ONE ARM

(71) Applicant: OTTOBOCK SE & CO. KGAA, Duderstadt (DE)

(72) Inventor: Benjamin Schirrmeister, Göttingen (DE)

(73) Assignee: OTTOBOCK SE & CO. KGAA, Duderstadt (DE)

( * ) Notice: Subject to any disclaimer, the term of this patent is extended or adjusted under 35 U.S.C. 154(b) by 855 days.

(21) Appl. No.: 17/613,029

(22) PCT Filed: May 13, 2020

(86) PCT No.: PCT/EP2020/063295
§ 371 (c)(1),
(2) Date: Nov. 23, 2021

(87) PCT Pub. No.: WO2020/234077
PCT Pub. Date: Nov. 26, 2020

(65) Prior Publication Data
US 2022/0219312 A1 Jul. 14, 2022

(30) Foreign Application Priority Data
May 22, 2019 (DE) ............ 10 2019 113 684.9

(51) Int. Cl.
*B25J 9/00* (2006.01)
*A61F 5/01* (2006.01)
*A61F 5/37* (2006.01)

(52) U.S. Cl.
CPC .......... *B25J 9/0006* (2013.01); *A61F 5/0102* (2013.01); *A61F 5/013* (2013.01); *A61F 5/3753* (2013.01);
(Continued)

(58) Field of Classification Search
CPC ........ B25J 9/0006; B25J 9/0009; A61F 5/013; A61F 5/0118; A61F 5/0102;
(Continued)

(56) References Cited

U.S. PATENT DOCUMENTS 5,188,587 A * 2/1993 McGuire ............... A61F 13/146
 2/45
5,538,015 A * 7/1996 Paulson ................. A61F 5/0118
 128/869

(Continued)

FOREIGN PATENT DOCUMENTS

CN 105050774 A 11/2015
CN 107530217 A 1/2018
(Continued)

OTHER PUBLICATIONS

China Patent Office "Office Action", issued in connection with China Patent Application No. 202080036668 dated Jun. 30, 2023.
(Continued)

*Primary Examiner* — Victoria Murphy
*Assistant Examiner* — Sara K Toich
(74) *Attorney, Agent, or Firm* — HOLLAND & HART LLP

(57) ABSTRACT

A device for supporting at least one arm of a user, wherein: the device has at least one arm-supporting element comprising an arm shell for placing on the arm, at least one passive actuator which is configured to apply a force to the at least one arm-supporting element, and at least one counter bearing for the force to be applied, with at least one force transmission element and a counter bearing element; the arm-supporting element is connected to the force transmission element via an articulation so as to be pivotable about at least one pivot axis; the device additionally has at least one restraining element which limits a movement of the arm (Continued)

shell along the arm towards the hand when the device is worn, but does not affect a movement of the arm shell in the opposite direction; and the at least one restraining element is designed to be flexible but inelastic, and/or has at least one portion which extends in an axillary manner.

20 Claims, 3 Drawing Sheets

(52) U.S. Cl.
CPC ............... *A61H 2201/1614* (2013.01); *A61H 2205/062* (2013.01)

(58) Field of Classification Search
CPC ............... A61F 5/3723; A61F 5/3746; A61F 2005/0179; A61F 5/3753; A61H 1/0274; A61H 2003/007; A61H 2205/062; A61H 2201/1614
See application file for complete search history.

(56) References Cited

U.S. PATENT DOCUMENTS

| | | | |
|---|---|---|---|
| 5,865,770 A | 2/1999 | Schectman | |
| 2006/0161220 A1* | 7/2006 | Kobayashi | ........... A61H 1/0277 601/33 |
| 2014/0033391 A1* | 2/2014 | Doyle | .................... A61B 90/53 2/16 |
| 2014/0158839 A1 | 6/2014 | Doyle | |
| 2016/0339583 A1* | 11/2016 | Van Engelhoven | ... B25J 9/0006 |
| 2018/0028274 A1 | 2/2018 | Doyle | |
| 2018/0111263 A1 | 4/2018 | Van et al. | |
| 2018/0235829 A1 | 8/2018 | Ryu et al. | |

FOREIGN PATENT DOCUMENTS

| | | | |
|---|---|---|---|
| CN | 107835675 A | 3/2018 | |
| CN | 108500957 | 9/2018 | |
| DE | 69030857 | 6/1997 | |
| DE | 102017112436 | 12/2018 | |
| WO | WO-0160291 A1 * | 8/2001 | ........... A61F 5/3738 |
| WO | 2017/157861 A1 | 9/2017 | |
| WO | 2018073629 | 4/2018 | |
| WO | 2018/224555 A1 | 12/2018 | |

OTHER PUBLICATIONS

International Search Report and Written Opinion issued in PCT/EP2020/063295, mailed Jul. 28, 2020.

* cited by examiner

DEVICE FOR SUPPORTING AT LEAST ONE ARM

CROSS-REFERENCE TO RELATED APPLICATIONS

This is a national phase application of International Application No. PCT/EP2020/063295, filed 13 May 2020, which claims the benefit of German Patent Application No. 10 2019 113 684.9, filed 22 May 2019.

TECHNICAL FIELD

The invention relates to a device for supporting at least one arm of a user, wherein the device has at least one arm support element with an arm shell for placing on the arm, at least one passive actuator that is configured to apply a force to the at least one arm support element, and at least one counter bearing for the force to be applied that comprises at least one force transmission element and a counter bearing element, wherein the arm support element is connected via a joint to the force transmission element such that it can be swivelled about at least one swivel axis.

BACKGROUND

Such devices are known, for instance, from US 2016/0081871 A1. Such devices feature hinge joints, which may be spring-loaded, for applying a support force to the upper arm. However, the disadvantage is that the various joints that are needed to replicate the possible movements of a shoulder must be very precisely oriented and arranged so that the joint axes intersect as closely as possible to the wearer's actual shoulder joint.

To resolve this issue, a device is known from DE 10 2017 112 436 A1 in which the force transmission element of the counter bearing is movably mounted in the style of a ball joint on the counter bearing element, which is designed, for example, in the form of a hip strap. As a result, it is no longer necessary to replicate the movements of a shoulder joint by means of mechanical joints.

However, it has been proven that with such devices the grip of the arm splint on the arm may be insufficient if the arm is simply placed in the arm shell. This effect is often exacerbated the further the arm is raised.

SUMMARY

The invention therefore aims to improve the positioning of the arm shell on the user's arm, even when the arms are raised to a considerable extent.

The invention solves the issue by way of a device for supporting at least one arm of a user according to the preamble of claim 1, characterised in that the device has a restraining element that limits a displacement of the arm shell along the arm towards the hand when the device is mounted, but does not influence a displacement of the arm shell in the opposite direction, the at least one restraining element being designed to be flexible yet inelastic and/or comprising at least one section that extends in an axillary manner.

The invention is based on the knowledge that with certain embodiments of the devices described here, it is possible that the force applied to the arm support element by the passive actuator may cause a displacement of the arm shell along the arm towards the hand, especially if the arm is raised. In exceptional cases, this may cause a displacement of the arm shell beyond the elbow. This is safely prevented by the restraining element of the device according to the invention, as a displacement of the arm shell along the arm towards the hand beyond a predetermined point is prevented.

Such a restraining element is particularly advantageous for device embodiments in which the force transmission element of the counter bearing is designed, for example, in the form of a rod or another compression force transmission element on which the arm support element is arranged such that it can be swivelled. The force applied to the arm support element by the passive actuator acts on the arm support element in such a way that it generates a torque that supports the arm. For example, this may be achieved with an eccentrically arranged force transmission lever or force application lever on which the passive actuator acts. This point of application is located away from the swivel axis of the swivel joint between the force transmission element and the arm support element, which generates the torque. The result of this embodiment is that, without a counter-load caused by the arm in the arm shell, the actuator ensures that the force transmission element and the arm support element are swivelled against each another about the swivel axis of the swivel joint until they are parallel, i.e. aligned in extension of each other. In this state, the distance between, for example, the counter bearing element of the counter bearing and the arm shell of the arm support element is at a maximum.

If the user of the device now raises their arm, the angle between the arm support element and the force transmission element increases. Due to the tendency of the actuator to align the force transmission element and the arm support element parallel to each other, it can therefore happen, especially when the user's arm is raised to a considerable extent, that the arm shell, in order to cause this stretching of the joint, is displaced towards the hand parallel to the arm. This leads to discomfort, potentially affects the freedom of movement of the elbow and lower arm, and reduces acceptance of the device.

The invention is based on the knowledge that this behavior can be remedied by providing a restraining element that prevents or at least restricts this displacement, but does not influence a displacement in the opposite direction.

The at least one restraining element can be designed to be flexible yet inelastic. This ensures that it can adapt to and follow the movement of the arm shell in which the user's arm is located, but still prevent the displacement of the arm shell towards the hand, which would result in an extension of the restraining element. In this case, it is not necessary to fully suppress the movement. An inelastic restraining element is understood in particular to mean an embodiment in which the forces occurring during proper use of the device lead to an elongation or extension of the at least one restraining element by a maximum of five centimeters, preferably a maximum of three centimeters, especially preferably a maximum of two centimeters, most preferably a maximum of one centimeter. This can be calculated, for example, by determining the total length of the at least one restraining element while the user of the device allows, for example, a full arm abduction to be conducted on their arm, i.e. moving the arm laterally upwards from a loose hanging position until it is fully raised. At no point during this movement does the at least one restraining element extend by more than the specified degree if the at least one restraining element is designed to be inelastic.

Alternatively or additionally, the at least one restraining element features at least one extension that extends in an axillary manner. For the purposes of the present invention, this means that, when the device is in the mounted state and the user's arm is hanging loose or during an arm abduction movement, the at least one restraining element extends in an area that is bounded laterally by the medial side of the arm, the lateral side of the chest wall. The area is restricted dorsally and ventrally by the frontal plane of the scapula, i.e. the shoulder blade, and the frontal plane of the sternum, i.e. the breast bone. The lower boundary of the area is formed by an imaginary line from the lower rib cage to the elbow. The upper boundary is formed by the lower boundary of the anatomical axilla, i.e. the armpit, which is usually defined as the axillary fascia (Fascia axillaris). In this embodiment, at least one section of the restraining element therefore extends in this area when the device is mounted and the user leaves their arm to hang or carries out an arm abduction movement.

In a particularly preferred embodiment, the at least one restraining element is designed to be both flexible and inelastic, and comprises a section that extends in an axillary manner.

Preferably, the at least one axillary section of the at least one restraining element forms a loop with at least one further section of the device, wherein said loop encloses a torso of the user when the device is mounted. The other section of the device is also preferably designed to be flexible yet inelastic. If a force is exerted on the arm support element and particularly on the arm shell by the passive actuator or otherwise, said force acting in the direction of the hand of the user's arm, the preferably inelastic loop, which forms part of the at least one restraining element, prevents a displacement of the arm shell along the arm towards the hand. At most, a slight displacement of the arm shell towards the hand can occur due to the slight elongation, as defined above, which also occurs with restraining elements that are considered inelastic.

Preferably, a second section that extends in an axillary manner constitutes part of the loop. However, this second axillary section preferably extends in the opposite axillary region, i.e. between the lateral chest wall and the medial upper arm of the respective other arm. This second axillary region is also bounded by the frontal plane of the sternum, i.e. the breast bone, on the one hand and the frontal plane of the scapula, i.e. the shoulder blade, on the other, the imaginary line between the lower ribcage and the elbow, and the lower boundary of the axilla, i.e. the axillary fascia, when the second arm hangs loosely or performs an arm abduction movement.

An arm abduction movement constitutes raising the arm at the side of the body.

In a preferred embodiment, the device has a second arm support element with a second arm shell for placing on a second arm of the user, wherein the at least one restraining element restricts a displacement of the second arm shell along the second arm towards the second hand when the device is mounted, but does not influence a displacement of the second arm shell in the opposite direction. In this embodiment, the device also preferably has a second passive actuator by means of which a supporting force can be applied to the second arm support element and therefore the second arm shell, so that the user's second arm is also supported.

In this embodiment of a device for supporting both arms, each with an arm support element, a counter bearing and a passive actuator, an embodiment with at least two restraining elements is of course also conceivable, wherein each of the at least two restraining elements prevents or restricts a displacement of one of the arm shells towards the respective hand. Preferably, the at least two restraining elements are designed to be flexible yet inelastic according to the definition above and/or each feature at least one section that extends in an axillary manner. Here, the two axillary regions through which the two respective axillary sections extend are defined on the opposite side of the users torso.

Advantageously, the at least one restraining element extends from the arm shell or the arm support element to the counter bearing.

It has been proven advantageous for the at least one axillary section of the at least one restraining element to extend from top to bottom, preferably within a sagittal plane, when the device is in the mounted state.

This does not necessarily mean that the entire axillary section extends in this direction. In a preferred embodiment, the at least one restraining element extends from the arm shell or another part of the arm support element along the upper arm towards the shoulder and from there from top to bottom, preferably within a sagittal plane, to reach the counter bearing element of the counter bearing.

The restraining element is preferably an item of clothing or part of an item of clothing, in particular a t-shirt, a shirt, a vest or a jacket.

The design as an item of clothing or part of an item of clothing has the advantage that the device is especially easy to mount and no additional elements must be attached to the body in order to, for example, render the restraining element functional. The restraining element is preferably designed in such a way that it prevents a displacement of the arm shell towards the user's hand regardless of the position of the arm relative to the user's torso. This is particularly easy to achieve with the use of an item of clothing as in this case, the restraining element is automatically arranged in its correct position and orientation and such that it can barely be moved relative to the wearer's body. The item of clothing is preferably made of a material, preferably a fabric, that is flexible yet inelastic within the meaning of the present invention.

Advantageously, the arm shells and/or the counter bearing element are arranged on the restraining element such that they can be detached. This is especially beneficial if the restraining element is an item of clothing. For example, the restraining element may be an item of upper body clothing, such as a t-shirt, that has a sleeve on which the arm shell can be detachably arranged, for example via velcro fasteners or press studs.

Alternatively or additionally, the counter bearing is detachably arranged on the restraining element, in particular in the form of an item of clothing. Advantageously, this is also achieved via velcro fasteners or press studs. In an especially preferred embodiment in which both the counter bearing element and the arm shell are detachably arranged on an item of clothing that constitutes the restraining element, in order to mount the device, the arm shell and the counter bearing element are first removed from the item of clothing. The item of clothing can then be put on normally. When the user of the device is wearing the item of clothing, the counter bearing element and the arm shell can be arranged on the item of clothing via a velcro fastener or other connecting elements. This is easy to do and at the same time ensures adjustability to the user's individual proportions.

In a preferred embodiment, the item of clothing features a reinforcement, particularly a coating, an additional fabric layer, particularly a woven fabric, or a reinforcement element, which is preferably made of a plastic. This reinforcement element preferably extends across at least one part of a path, but preferably across the entire path, from the arm shell to the counter bearing element. In this way, the forces that occur can be absorbed in a manner that is particularly gentle on the item of clothing and a displacement of the arm shell towards the hand prevented, without the item of clothing becoming damaged, even when used frequently.

Advantageously, the restraining element has at least one strap that is arranged on the arm shell and an attachment element, particularly a harness, which is arranged on the user's upper body when the device is mounted. A restraining element can also be achieved in this way. For example, the attachment element can be designed in the form of a shoulder strap, shoulder holster or another shoulder harness. In the form of at least one strap, the restraining element is attached at one end to said attachment element and at the other end to the arm shell, so that a slipping or displacement of the arm shell along the arm towards the hand is not possible.

Advantageously, the restraining element prevents a displacement of the arm shell along the arm towards the hand to such an extent that the arm shell does not reach the elbow region. Specifically, this means that the elbow does not come into contact with the arm shell when the device is mounted.

The at least one restraining element preferably acts as a counter bearing and can therefore counteract a force that acts directly or indirectly on the arm shell in the direction of the hand of the supported arm. In preferred embodiments, this prevents the joint by which the arm support element and the force transmission element are connected to each other from being stretched without the arm being moved, especially raised. This can be achieved, for example, by ensuring that the at least one restraining element extends around a body part of the user, for example the neck or torso. In this case, when a force is exerted on the arm shell towards the hand, the at least one restraining element can yield to this force by moving in the direction of the force until the loop enclosing the body part prevents a further movement of the at least one restraining element. The arm shell can then only be displaced by an elongation or extension of the at least one restraining element. However, due to the inelasticity of the material of the at least one restraining element, this is very limited or even impossible.

Preferably, there is an anti-slip coating, for example made of silicon, on an inner side of the at least one restraining element. This is particularly advantageous if the inner side comes into contact with and rests on the user's skin when the device is in the mounted state.

BRIEF DESCRIPTION OF THE DRAWINGS

Various examples of embodiments of the present invention will be explained in more detail by way of the attached figures: They show.

DETAILED DESCRIPTION

Figure 1:
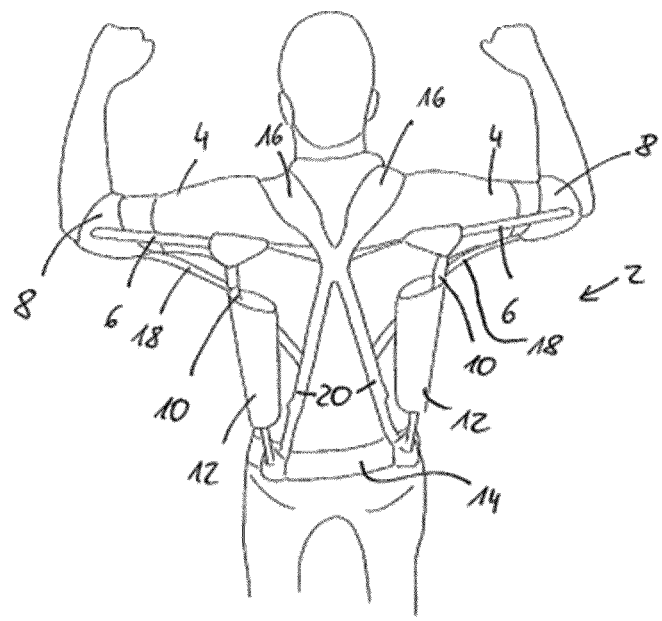
FIGS. 1 to 3—schematic representations of a device according to an example of an embodiment of the present invention in the worn state, and FIGS. 4 to 6—the representations from FIGS. 1 to 3 with a device according to a further example of an embodiment of the present invention.

FIG. 1 shows a rear view of a user 2 of the device with two raised arms 4. The device has two arm support elements 6, each of which bears an arm shell 8 that is mounted on an upper arm of the user 2. The arm support elements 6 are each connected to a force transmission element 10 that extends in a sleeve 12, where the passive actuator that is not shown in the figures is also located; it is not depicted for the sake of clarity. The lower end of the force transmission elements 10 is arranged on a counter bearing element 14, which is designed in the form of a pelvic harness or hip strap. The device is fixed to the user via two shoulder straps 16 that are connected to the counter bearing element 14.

The device shown in FIG. 1 also has two restraining elements 18, which are connected to the lower strap sections 20 of the shoulder straps 16 and arranged on the arm shell 8 at the opposite end. Each arm shell 8 comprises a separate restraining element 18. Instead of being arranged on the arm shell 8, the respective end of the restraining element 18 can also be arranged on the arm support element 6.

If the arms 4 of the user 2 are raised further from the position shown in FIG. 1, the angle between the respective arm support element 6 and the associated force transmission element 10 increases. Since the passive actuator, not depicted here, applies a supporting force to the arm support element 6, the actuator may cause the joint between the arm support element 6 and the force transmission element 10 to stretch without the user 2 wanting it to do so. The restraining element 18 is provided to prevent this, wherein it prevents the arm shell 8 from being displaced along the respective arm 4 towards the hand. Without this displacement, an accidental or unintentional stretching of the joint is not possible.

Figure 2:
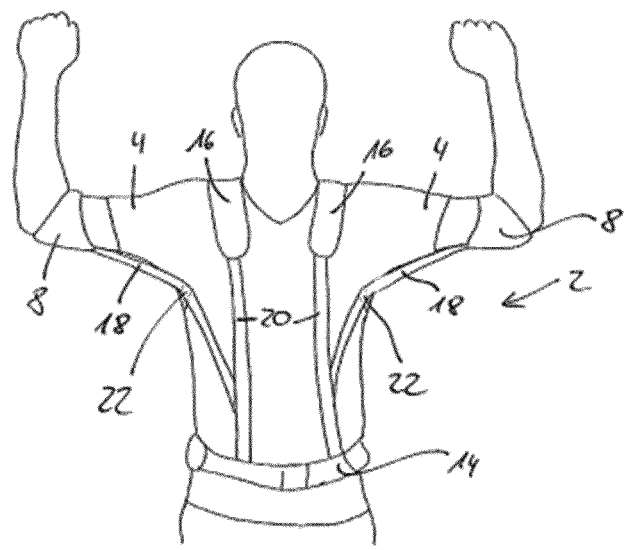

FIG. 2 depicts a frontal view of the user 2 from FIG. 1. The raised arms 4, arm shells 8, shoulder straps 16, which are also connected to the counter bearing element 14 in the frontal area by way of lower strap sections 20, and the two restraining elements 18 can be seen. The first section of the respective restraining element 18, as seen from the arm shell 8, extends in an axillary manner. In this area, the restraining element 18 is preferably a single strap made of a flexible yet inelastic material. Further on, a bifurcation 22 occurs where, in the example of an embodiment shown, the restraining elements 18 are split into a frontal section, shown in FIG. 2, and a dorsal section, shown in FIG. 1.

Figure 3:
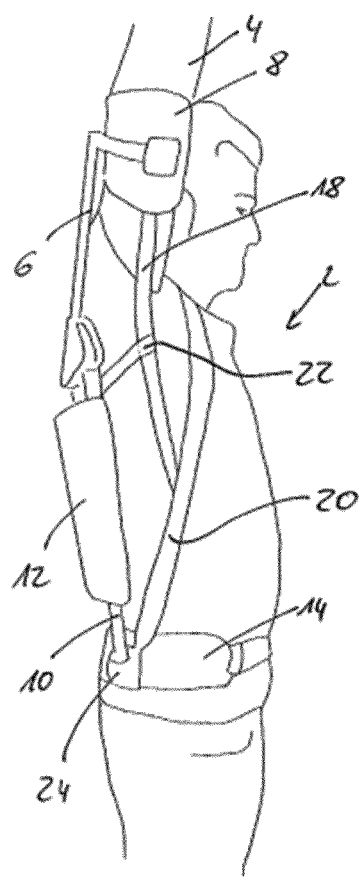

FIG. 3 shows a side view of the user 2. The arm 4 of the user 2 is raised and the arm shell 8 that is arranged on the arm support element 6 can be seen. Both the force transmission element 10 and the passive actuator not shown in FIG. 3 extend in the sleeve 12. In the representation in FIG. 3, the restraining element 18 can be seen particularly clearly, which in the upper section in FIG. 3, which adjoins the arm shell 8, is designed as a single strap that is split into two straps at the bifurcation 22. In the example of an embodiment shown, both the frontal section and the dorsal section are arranged on the lower strap sections 20 and thus connected to the counter bearing element 14. In FIG. 3, it is also clear that the lower end of the force transmission element 10 is arranged on the counter bearing element 14 via a ball element 24. This can be achieved, for example, in that the end of the force transmission element 10 is inserted into a specially provided pocket on the counter bearing element 14, instead of providing an actual ball joint.

Figure 4:
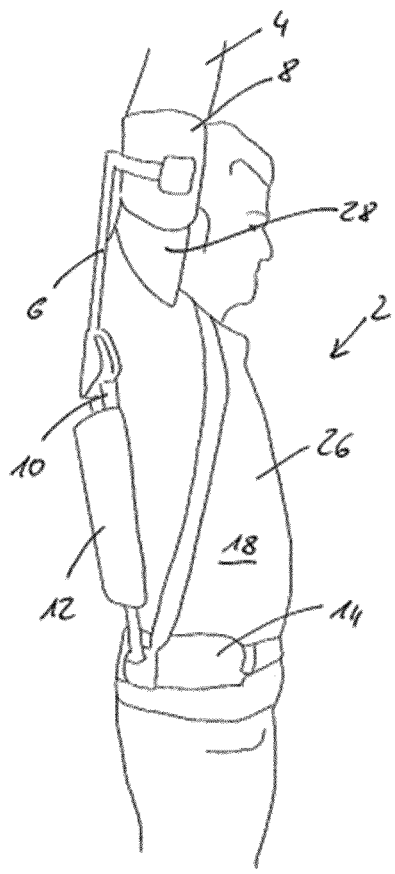

FIG. 4 shows the user 2 in the position shown in FIG. 3 with a device according to a further example of an embodiment of the present invention. Unlike in FIGS. 1 to 3, the restraining element 18 is not designed in the form of a separate strap, but is formed by the t-shirt 26. The arm shell 8 arranged on the arm support element 6 is connected to the sleeve 28 of the t-shirt. The passive actuator, also not depicted in FIG. 4, which extends along the sleeve 12, exerts a supporting force on the arm support element 6 and without a restraining element 18 could cause the arm shell 8 to be displaced along the arm 4 towards the hand, i.e. upwards in FIG. 4, in order to stretch a joint between the arm support element 6 and the force transmission element 10. Since the arm shell 8 is arranged on the t-shirt 26 that forms the restraining element 18 and the lower end of the t-shirt 26 is connected to the counter bearing element 14, the arm shell 8 cannot be displaced or only to a very small extent upwards along the arm without the arm 4 being raised further. This prevents the displacement of the arm shell 8 along the arm 4 towards the hand. The contact between the lower end of the t-shirt 26 and the counter bearing element 14 may be achieved, for example, via velcro elements. However, it may be sufficient to design the counter bearing element 14 in the form of a belt or strap and thus apply a pressure by which the lower end of the t-shirt 26 is clamped between the counter bearing element 14 and the wearer's body. Of course, it is also possible to tuck the t-shirt 26 into trousers, for example, and achieve the required clamping effect via the trousers and/or a belt of the trousers.

Figure 5:
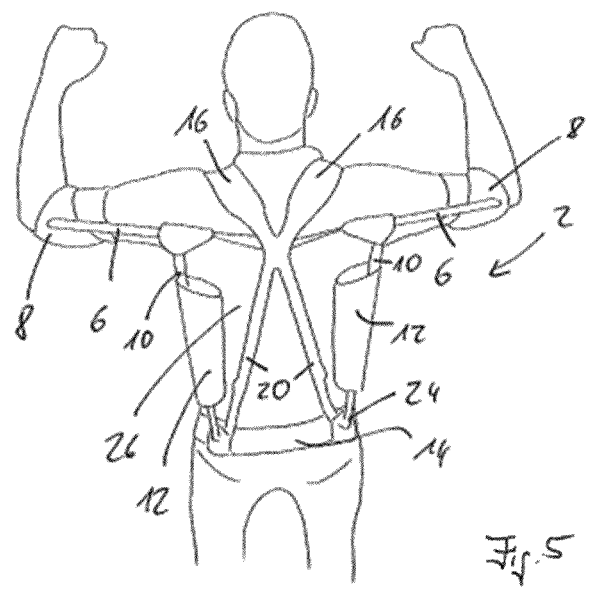
Figure 6:
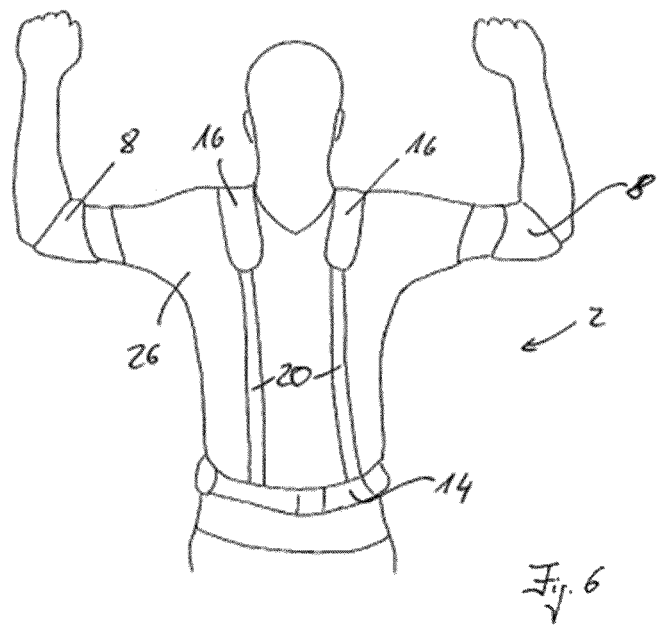

FIGS. 5 and 6 show the user 2 in the positions from FIGS. 1 and 2 with a device according to FIG. 4. The arm shells 8 are connected to the t-shirt 26, so that this t-shirt 26 acts as a restraining element 18. In this case, therefore, there is also at least one section of the t-shirt 26 that extends in an axillary manner. It is especially preferable if the t-shirt 26, particularly in said section, is made of a material that is designed to be flexible yet as inelastic as possible.

In FIGS. 5 and 6 the device also features two shoulder straps 16 which, both in the frontal section in FIG. 6 and the rear section in FIG. 5, are connected to the counter bearing element 14 via lower strap sections 20. The arm shells 8 are located on the arm support element 6, which is connected to the respective force transmission element 10 via a joint. Said element extends along the sleeve 12 in which the passive actuator is also located, the latter not being depicted for the sake of better clarity. The lower ends of the force transmission elements 10 are connected to the counter bearing element 14 via ball joints 24.

REFERENCE LIST 2 user
4 arm
6 arm support element
8 arm shell
10 force transmission element
12 sleeve
14 counter bearing element
16 shoulder strap
18 restraining element
20 lower strap section
22 bifurcation
24 ball joint
26 t-shirt
28 sleeve

The invention claimed is:

1. A device for supporting at least one arm of a user, wherein the device has
at least one arm support element with an arm shell for placing on the arm,
at least one passive actuator, which is configured to apply a force to the at least one arm support element, and
at least one counter bearing for the force to be applied, which comprises at least one force transmission element and a counter bearing element,
wherein the at least one arm support element is connected to the force transmission element via a joint such that the at least one arm support element can be swivelled about at least one swivel axis,
wherein application of the force to the at least one arm support element by the at least one passive actuator when the at least one arm of the user is raised such that an elbow of the user is above a shoulder of the user causes displacement of the arm shell along the at least one arm of the user toward a hand of the user,
characterized in that the device also comprises at least one restraining element that restricts the displacement of the arm shell along the arm towards the hand when the device is mounted and the at least one passive actuator applies the force to the at least one arm support element, but does not influence a displacement of the arm shell in the opposite direction, wherein the at least one restraining element is designed to be flexible yet inelastic.

2. The device according to claim 1, wherein the at least one restraining element comprises at least one section that extends in an axillary manner and the at least one axillary section of the at least one restraining element in combination with at least one further section of the device forms a loop on a torso of the user when the device is mounted.

3. The device according to claim 2, wherein the at least one restraining element further comprises a second axillary section and the second axillary section, the at least one axillary section, and the at least one further section of the device forms the loop.

4. The device according to claim 3, characterized in that the device has a second arm support element with a second arm shell for placing on a second arm of the user and the at least one restraining element restricts a displacement of the second arm shell along the second arm towards a second hand when the device is mounted, but does not influence a displacement of the second arm shell in the opposite direction.

5. The device according to claim 1, characterized in that the restraining element extends from the arm shell or the at least one arm support element to the counter bearing element.

6. The device according to claim 5, wherein the at least one restraining element comprises at least one section that extends in an axillary manner and the at least one axillary section of the at least one restraining element extends from top to bottom, within a sagittal plane, when the device is in the mounted state.

7. The device according to claim 1, characterized in that the restraining element is an item of clothing or part of an item of clothing, the item of clothing being a t-shirt, a shirt, a vest or a jacket.

8. The device according to claim 1, characterized in that the arm shell and/or the counter bearing element is detachably arranged on the restraining element.

9. The device according to claim 7, characterized in that the item of clothing features a reinforcement.

10. The device according to claim 9, characterized in that the reinforcement is a coating, an additional layer of fabric, or a reinforcement element.

11. The device according to claim 9, characterized in that the reinforcement extends across at least one section of a path from the arm shell to the counter bearing element.

12. The device according to claim 1, characterized in that the restraining element has at least one strap that is arranged on the arm shell and an attachment element which is arranged on the user's upper body when the device is mounted.

13. A device for supporting the arms of a user, the device comprising:
- a first arm support element with a first arm shell for placing on a first arm;
- a second arm support element with a second arm shell for placing on a second arm;
- at least one passive actuator configured to apply a force to at least one of the first and second arm support elements;
- at least one counter bearing which comprises at least one force transmission element and a counter bearing element, wherein the first and second arm support elements are each connected to the at least one force transmission element via a first joint such that the first and second arm support elements can be swivelled about at least one swivel axis, wherein the at least one force transmission element is connected to the counter bearing element via a second joint such that the at least one force transmission element can be swivelled;
- wherein application of the force to at least one of the first and second arm support elements by the at least one passive actuator when at least one of the first and second arms of the user is raised such that an elbow of the user is above a shoulder of the user causes displacement of at least one of the first and second arm shells along the at least one of the first and second arms of the user toward at least one of a first and second hand of the user,
- wherein the device also comprises at least one restraining element to restrict the displacement of at least one of the first and second arm shells along at least one of the first and second arms towards at least one of the first and second hands of the user when the device is mounted and the at least one passive actuator applies the force to the at least one of the first and second arm support elements, but which does not influence a displacement of the first and second arm shells in the opposite direction;
- wherein the at least one restraining element is designed to be flexible yet inelastic and forms a loop with at least one further section of the device, wherein the loop is formed on a torso of a user when the device is mounted on the user.

14. The device according to claim 13, wherein the restraining element extends from the first and second arm shells or the first and second arm support elements to the counter bearing element.

15. The device according to claim 14, wherein the at least one restraining element comprises at least one section that extends in an axillary manner and the at least one axillary section of the at least one restraining element extends from top to bottom, within a sagittal plane, when the device is in the mounted state.

16. The device according to claim 13, wherein the restraining element is an item of clothing or part of an item of clothing, the item of clothing being a t-shirt, a shirt, a vest or a jacket.

17. The device according to claim 13, wherein the arm shell and/or the counter bearing element is detachably arranged on the restraining element.

18. The device according to claim 16, wherein the item of clothing features a reinforcement.

19. The device according to claim 18, wherein the reinforcement is a coating, an additional layer of fabric, or a reinforcement element.

20. A device for supporting the arms of a user, the device comprising:
- a first arm support element with a first detachable arm shell for placing on a first arm;
- a second arm support element with a second detachable arm shell for placing on a second arm;
- at least one passive actuator configured to apply a force to at least one of the first and second arm support elements;
- at least one counter bearing which comprises at least one force transmission element and a counter bearing element, wherein the first and second arm support elements are each connected to the at least one force transmission element via a first joint such that the first and second arm support elements can be swivelled about at least one swivel axis, wherein the at least one force transmission element is connected to the counter bearing element via a second joint such that the at least one force transmission element can be swivelled;
- wherein application of the force to at least one of the first and second arm support elements by the at least one passive actuator when at least one of the first and second arms of the user is raised such that an elbow of the user is above a shoulder of the user causes displacement of at least one of the first and second arm shells along the at least one of the first and second arms of the user toward at least one of a first and second hand of the user,
- wherein the device also comprises at least one restraining element in the form of an item of clothing or part of an item of clothing, the item of clothing being a t-shirt, a shirt, a vest or a jacket, the restraining element being adapted to restrict the displacement of at least one of the first and second arm shells along at least one of the first and second arms towards at least one of the first and second hands of the user when the device is mounted and the at least one passive actuator applies the force to at least one of the first and second arm support elements in a direction of the first and second hands of the user, but which does not influence a displacement of the first and second arm shells in the opposite direction;
- wherein the at least one restraining element features a reinforcement and is designed to be flexible yet inelastic.

* * * * *